United States Patent [19]

Matsuzawa

[11] 4,129,519

[45] Dec. 12, 1978

[54] THERMO-LUMINESCENT MATERIAL

[75] Inventor: Takashi Matsuzawa, Tokyo, Japan

[73] Assignee: Nemoto Tokusho Kagaku Kabushiki Kaisha, Japan

[21] Appl. No.: 809,778

[22] Filed: Jun. 24, 1977

[30] Foreign Application Priority Data

Jun. 29, 1976 [JP] Japan .................................. 51-772776

[51] Int. Cl.$^2$ ...................... C09K 11/50; C09K 11/44; C09K 11/42; C09K 11/18
[52] U.S. Cl. ............................ 252/301.4 H; 252/408; 250/484; 252/301.4 P; 252/301.4 S; 252/301.4 F
[58] Field of Search ................. 252/301.4 H, 301.4 F, 252/301.4 P, 301.4 S, 408; 250/484

[56] References Cited

U.S. PATENT DOCUMENTS

| 3,320,180 | 5/1967 | Swinehart ..................... 252/301.4 H |
| 3,402,293 | 9/1968 | Shambon .................. 252/301.4 H X |
| 3,413,235 | 11/1968 | Jones et al. .................... 252/301.4 H |

FOREIGN PATENT DOCUMENTS

| 1221747 | 7/1966 | Fed. Rep. of Germany ... 252/301.4 H |
| 53839 | 1/1966 | Poland .............................. 252/301.4 H |
| 1154484 | 6/1969 | United Kingdom ............. 252/301.4 H |

OTHER PUBLICATIONS

Murayama et al. "Chem. Abstracts" vol. 81, 1974, 44583U.

Primary Examiner—Jack Cooper
Attorney, Agent, or Firm—McGlew and Tuttle

[57] ABSTRACT

A lithium fluoride thermo-luminescent material with increased sensitivity, which comprises crystals or powdery crystallites of lithium fluoride having present therein (A) luminescent center consisting of magnesium and at least one element or more selected from the elemental group consisting of copper, silver, and gold, and (B) sensitizer therefor consisting of at least one element or more selected from the elemental group consisting of carbon, phosphorus, sulfur, arsenic, selenium and tellurium.

2 Claims, 3 Drawing Figures

THERMO-LUMINESCENT MATERIAL

FIELD AND BACKGROUND OF THE INVENTION

This invention relates to a thermo-luminescent material. More particularly, this invention is concerned with a highly sensitive composition based on crystalline lithium fluoride, which composition exhibits an excellent thermo-luminescence property and is suitable for use in radiation dosimetry.

DESCRIPTION OF THE PRIOR ART

As dosimetric elements based on thermo-luminescent materials have been hitherto employed in practice calcium fluoride($CaF_2$), calcium sulfate($CaSO_4$), lithium fluoride (LiF), lithium borate ($Li_2B_4O_7$) and the like. Among these, lithium fluoride has been regarded as most suitable for medical use as in man because of its following advantageous characteristics:

1. It is almost equivalent to the tissue of human body.
2. It shows less dependence on energy.
3. It shows little retrogression of the accumulated dose at temperatures around body temperature.
4. It is not influenced by the temperature at the time of irradiation, even when it is close to body temperature.

The lithium fluoride, however, produces less amount of light emission from thermo-luminescence. As a consequence its sensitivity in dosimetry with radioactive isotopes is considerably low in comparison with that of calcium derivatives, with the result that the presicion of measurement becomes low at low doses and that the detection sensitivity(lower detection limit) drops to several milliroentgen, it thus being impossible to measure doses lower than the lower limit.

SUMMARY OF THE INVENTION

Extensive studies have therefore been made with a view to eliminating such drawbacks involved in the use of lithium fluoride as mentioned above and it has now been found that addition thereto of certain metals or non-metals leads to a significant difference in its intensifying activity. The present invention has been accomplished on the basis of this finding. Thus in accordance with the present invention, the amount of light emission by thermo-luminescence can be markedly increased without adversely influencing the advantageous characteristics inherent to lithium fluoride, and the low measurement sensitivity in dosimetry at low doses, which has been hitherto regarded as the greatest drawback involved in the use of lithium fluoride, can be improved to a remarkable extent.

More specifically, the present invention provides a thermo-luminescent material capable of emitting an intense light as of such intensity as is higher than that of previous materials (in which magnesium alone is used as luminescent center) by factors of several tens to one hundred. The thermo-luminescent material in accordance with the present invention comprises crystals or powdery crystallites of lithium fluoride having present therein (A) luminescent center consisting of magnesium in combination with at least one element or more selected from the elemental group consisting of calcium strontium, copper, silver, and gold, aluminum and gallium and (B) sensitizer therefor consisting of at least one element or more selected from the non-metallic elemental group consisting of boron, carbon, silicon, phosphorus, sulfur, arsenic, selenium and tellurium.

The various features of novelty which characterize the invention are pointed out with particularity in the claims annexed to and forming a part of this disclosure. For a better understanding of the invention, its advantages and specific objects attained by its uses, reference should be had to the accompanying drawings and descriptive matter in which there are illustrated preferred embodiments of the invention.

BRIEF DESCRIPTION OF THE DRAWINGS

In the drawings:

FIG. 3 shows an emission spectrum of the product of the invention, lithium fluoride-magnesium-copper-phosphorus.

DESCRIPTION OF THE PREFERRED EMBODIMENTS

The thermo-luminescent material of the invention may be produced by subjecting powdered lithium fluoride containing activators and the like to heat treatment in an inert gas stream with the use of any conventional tubular electric furnace. The resulting baked product then may be comminuted until the desired particle size is reached, and washed with acid and then water and dried into the finished product. The amounts of the activators to lithium fluoride are preferably in the range of from 0.05 to 1.0 mol%, based on the lithium fluoride, for the main activator magnesium and also for the activator selected from the elemental group consisting of calcium strontium, copper, silver, gold, aluminum and gallium, For the sensitizing additive selected from the non-metallic group consisting of boron, carbon, silicon, phosphorus, sulfur, arsenic, selenium and tellurium, the preferred proportion based on the lithium fluoride is, although depending on the kind of the specific element, preferably in the range of from about 0.1 to 5.0 mol%.

Conditions for the heat treatment depend to some extent on the size of the furnace, that of the crucible, and other factors. In general, however, it is preferred to carry out the heat treatment at temperatures in the range of from 700° to 1,100° C. for periods of time in the range of from 30 minutes to 3 hours. The acid washing and the water washing are incorporated for the purpose of removing from lithium fluoride residual excesses and decomposition products of the activators which are not taken up into the crystal lattice of the lithium fluoride.

Figure 1:
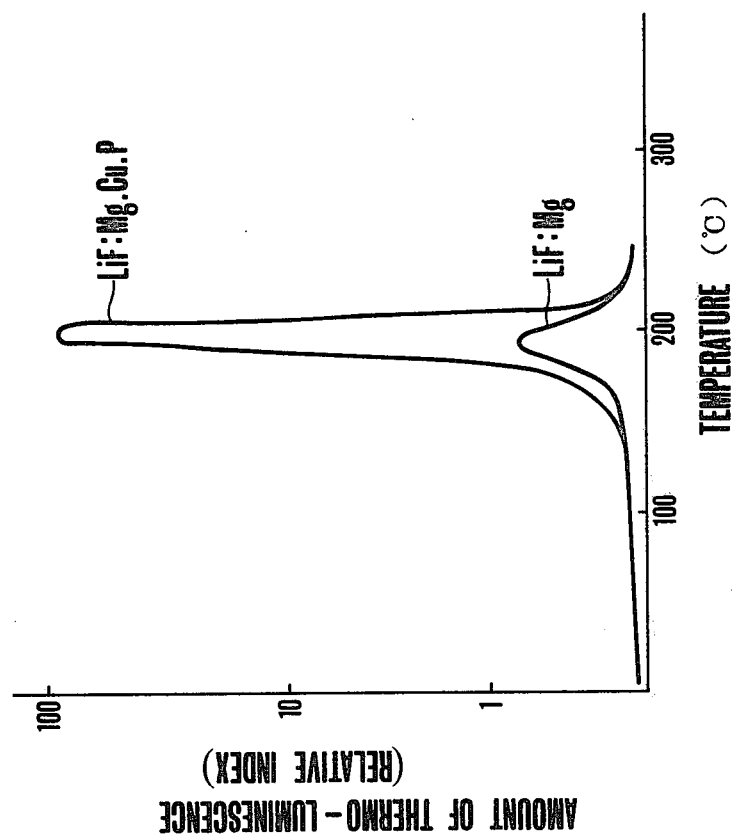
FIG. 1 shows the difference in the amount of light emission by thermo-luminescence between the prior art product, lithium fluoride-magnesium, and the product of the invention, lithium fluoride-magnesium-copper-phophorus.

In the following are shown the radiation characteristics of the thermo-luminescent material of the invention on the basis of some test results. The glow curve, as shown in FIG. 1, shows the glow peak at about 200° C., thus having a convenient pattern for use in dosimetry. As regards the amount of thermo-luminescence, the product of the invention, for example, lithium fluoride-magnesium-copper with boron (a non-metal of Group 3A in the Periodic Table) added is found to produce 20-30 times larger amount of light emission in comparison with the prior art product, lithium fluoride-magnesium. Similarly, the addition of carbon or silicon(non-metals of Group 4A) give rise to an increase in the amount of light emission over the prior art product by factors of from about 30 to about 40. Furthermore, the addition of phosphorus or arsenic(non-metals of Group 5A) brings about an increase in the amount of light emission up to 80-100 times and that of sulfur, selenium or tellurium(non-metals of Group 6A) up to 60-70 times. Moreover, the use of such non-metallic elements in combination causes an increase in the amount of light emission by factors of 20-40.

As another embodiment of the invention there may be mentioned lithium fluoride-magnesium-phosphorus to which has been added calcium belonging to Group 2A in the same way as magnesium. In this case can be attained an increase in the amount of light emission over the prior art product by a factor of 20-30. Also in the case of addition of copper, silver or gold (metals of Group 1B) an increase in the amount of light emission by factors of about 80-100 is found to be reached. In the case of addition of aluminum or gallium (metals of Group 3A) brings about an increase in the amount of light emission by factors of about 10.

Figure 2:
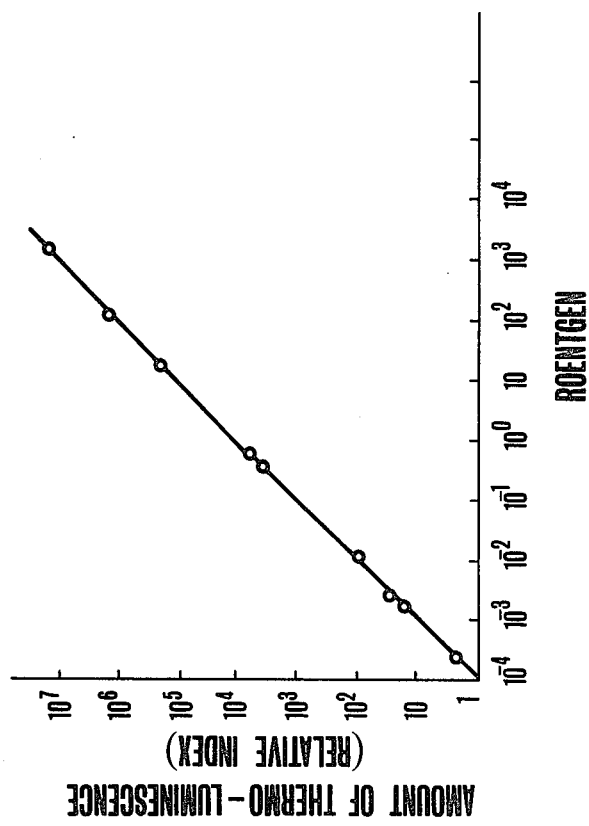

As shown in FIG. 2, the dose of irradiation shows a good linear relationship with the amount of thermo-luminescence over a wide dose range of from 0.1 milli-roentgen up to 10,000 roentgens, which indicates that as a result of the increase in sensitivity in accordance with the present invention low doses in the order of 0.1 milliroentgen can be measured well.

Figure 3:
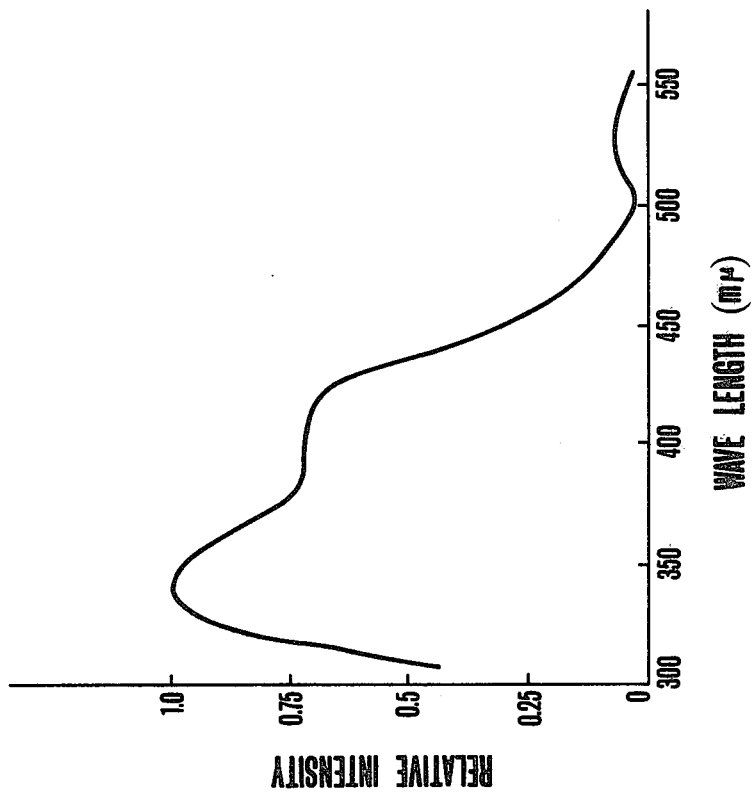
FIG. 3 shows the relationship between the dose of irradiation and the amount of light emission.

The thermo-luminescent material of the present invention shows an emission spectrum as shown in FIG. 3.

The thermo-luminescent material of the invention has an effective atomic number of about 8.13, which is close to that of the living tissue(7.16), showing at the same time little dependence on energy. In addition it exhibits little the phenomenon of retrogression. Thus there is little difference from the prior art lithium fluoride product in these respects.

As is apparent from the above-mentioned characteristics, the thermo-luminescent material in accordance with the present invention eliminates the drawbacks involved in the use of lithium fluoride and is comparable to the prior art high sensitivity thermo-luminescent materials based on calcium or the like. Thus, it finds wide use not only in medicine, but also in general radiation dosimetry.

The present invention is explained in more detail by the following specific examples:

EXAMPLE 1

| | |
|---|---|
| Lithium fluoride (LiF) | |
| Magnesium fluoride (MgF$_2$) | 0.2 mol % |
| Cupric chloride (CuCl$_2$) | 0.05 mol % |
| Ammonium primary phosphate (NH$_4$H$_2$PO$_4$) | 0.46 mol % |

The above-mentioned powdered raw materials of lithium fluoride, magnesium, copper and phophorus are mixed in the proportions also mentioned above, placed in a platinum crucible. The cruicible is placed in a tubular electric furnace, heated at a temperature of 1,050° C. for 30 minutes under a nitrogen stream and cooled down to normal temperature. The contents are removed from the crucible, milled into a particle size of 90-200 mesh, washed with about 1N hydrochloric acid and then distilled water and dried.

EXAMPLE 2

| | |
|---|---|
| Lithium fluoride (LiF) | |
| Magnesium chloride (MgCl$_2$) | 0.2 mol % |
| Cupric sulfate (CuSO$_4$) | 0.05 mol % |
| Silicon dioxide (SiO$_2$) | 0.86 mol % |

The above-mentioned magnesium chloride is dissolved in distilled water and mixed with thorough stirring with a powder mixture of silicon dioxide and lithium fluoride in the amounts mentioned above. The resulting mixture is dried to obtain a powder mixture again. The powder mixture is placed in a platinum crucible and subjected, in the same way as in Example 1, to the 30-minute heat treatment at a temperature of 1,050° C. in an electric furnace.

The contents are discharged from the crucible and screened so that particles of particle size 90-200 mesh are obtained. The particles are charged with 1N hydrochloric acid and the mixture is boiled for several minutes then washed with distilled water until no chloride ions are detected, and finally dried.

EXAMPLE 3

| | |
|---|---|
| Lithium fluoride (LiF) | |
| Magnesium fluoride (MgF$_2$) | 0.2 mol % |
| Silver chloride (AgCl) | 0.05 mol % |
| Boric acid (H$_3$BO$_4$) | 0.84 mol % | fluoride, magnesium, raw materials of lithium boron and silver are mixed together in the proportions indicated above in the form of powder as in Example 1. The powder mixture is subjected, in the same manner as in Example 1, to heat treatment, removed from the crucible and subjected, again in the same manner as in Example 1, to washing with acid and water, and dried.

EXAMPLE 4

| | |
|---|---|
| Lithium fluoride (LiF) | |
| Magnesium fluoride (MgF$_2$) | 0.2 mol % |
| Aluminum oxide (Al$_2$O$_3$) | 0.05 mol % |
| Tellurium oxide (TeO$_2$) | 0.80 mol % |

The powdered raw materials are mixed together and subjected, in the same manner as in Example 1, to heat treatment, milling, acid washing and water washing, and dried.

EXAMPLE 5

| | |
|---|---|
| Lithium fluoride (LiF) | |
| Magnesium fluoride (MgF$_2$) | 0.2 mol % |
| Calcium oxide (CaO) | 0.4 mol % |
| Silicon dioxide (SiO$_2$) | 0.86 mol % |
| Ammonium primary phosphate (NH$_4$H$_2$PO$_4$) | 0.46 mol % |

The powdered raw materials are mixed together and subjected in the same manner as in Example 1, to heat treatment, milling, acid washing and water washing, and dried.

EXAMPLE 6

| | |
|---|---|
| Lithium fluoride (LiF) | |
| Magnesium fluroide (MgF$_2$) | 0.2 mol % |
| Cupric chloride (CuCl$_2$) | 0.05 mol % |
| Tellurium oxide (TeO$_2$) | 0.80 mol % |

The above-mentioned raw materials are processed in the same way as in Example 1.

It is to be understood that many other combinations of raw materials other than those employed in the above-mentioned Examples may be treated in the same manner as in Examples to obtain thermo-luminescent materials.

What is claimed is:

1. A thermo-luminescent material which comprises crystals or powdery crystallites of lithium fluoride having present therein (A) activators consisting of from 0.05 to 1.0 mol% of magnesium in combination with at least one element selected from the elemental group consisting of copper, silver, and gold, in amount of 0.05–1.0 mol%, respectively, with respect to the LiF, and (B) sensitizers therefor consisting of at least one element selected from the group consisting of carbon, phosphorus, sulfur, arsenic, selenium and tellurium in amount of 0.1 – 5.0 mol% respectively with respect to the LiF.

2. A process for the preparation of a thermo-luminescent material, which process comprises adding to crystals or powdery crystallites of LiF (A) activators consisting of 0.05 – 1.0 mol% of magnesium and at least one element selected from the elemental group consisting of copper, silver, and gold, in amount of 0.05 – 1.0 mol%, respectively, with respect to the LiF, and (B) a sensitizer therefor consisting of at least one element selected from the elemental group consisting of carbon, phosphorus, sulfur, arsenic, selenium, and tellurium in amount of 0.1 – 5.0 mol%, respectively, with respect to the LiF to obtain a powdery mixture thereof; and heating said mixture at a temperature of from 700° to 1100° C. under an inert gas stream for a period of from about 30 minutes to about 3 hours.

* * * * *